Patented May 20, 1924.

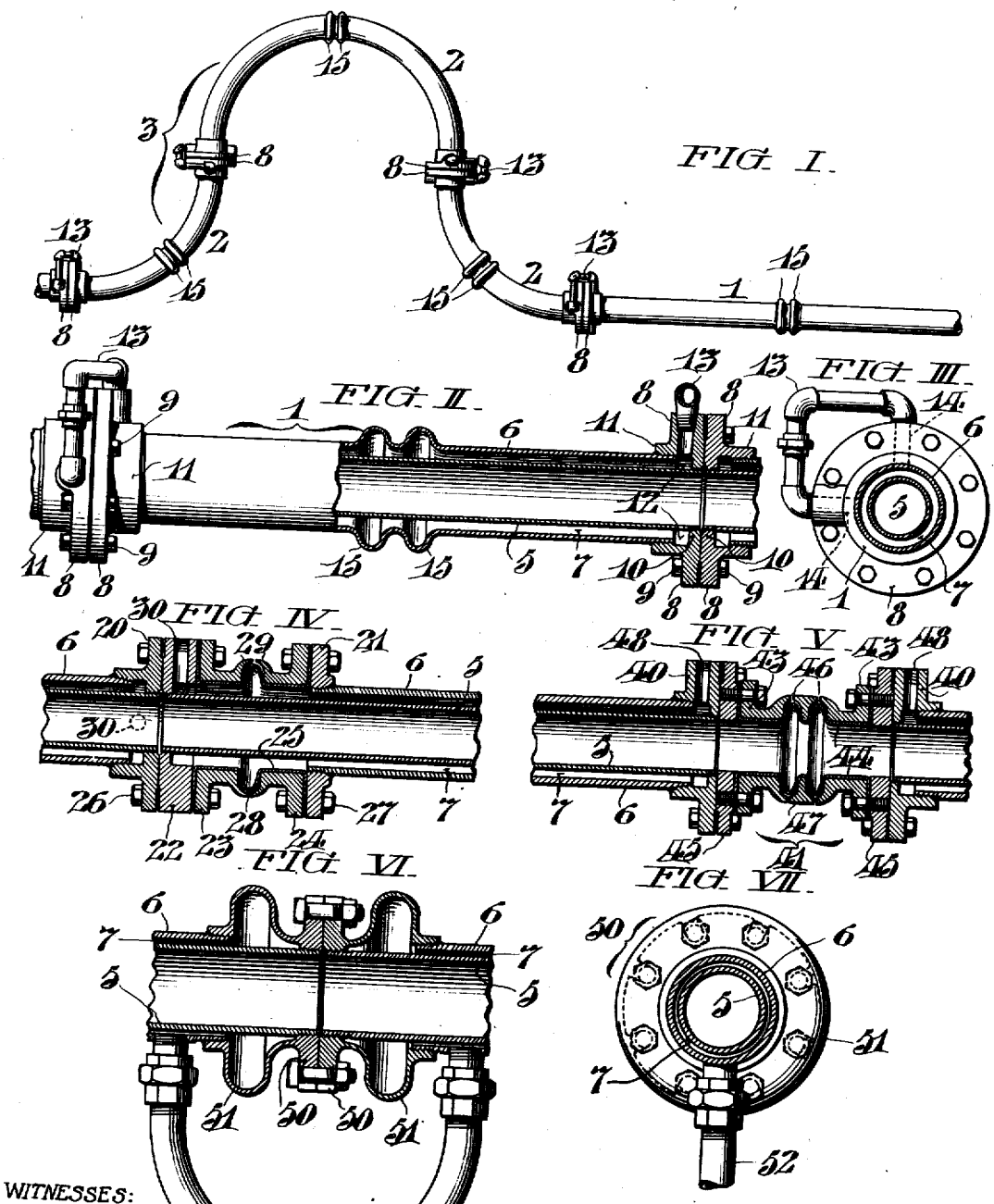

1,495,066

UNITED STATES PATENT OFFICE.

FRANK A. BROWNE, OF WAYNE, PENNSYLVANIA, ASSIGNOR TO THE BARBER ASPHALT PAVING COMPANY, OF PHILADELPHIA, PENNSYLVANIA, A CORPORATION OF WEST VIRGINIA.

JACKETED CONDUIT.

Application filed July 18, 1921. Serial No. 485,718.

*To all whom it may concern:*

Be it known that I, FRANK A. BROWNE, a citizen of the United States, residing in Wayne, in the county of Delaware and State of Pennsylvania, have invented certain new and useful Improvements in Jacketed Conduits, whereof the following is a specification, reference being had to the accompanying drawings.

My invention relates to conduits or conduit systems useful in conducting substances or compounds which require constant application of heat to maintain them in a fluid condition, such for example as tar, pitch, asphalt, and the like.

Conduits of the kind referred to ordinarily take the form of a double pipe, or, in other words, comprise two pipes, one disposed centrally within the other, with sufficient interspace between the two to afford an annular passage through which a suitable heating medium like steam or hot water may be circulated to prevent coagulation of the material as it is passed, under pressure, through the inner of the two pipes. In large manufacturing plants where highly viscous substances are to be transferred considerable distances, the jacketed conduits must of necessity be made up of a number of interconnected sectional lengths or units. Considerable difficulty has been experienced in maintaining the joints between units of such a system liquid tight on account of uneven linear expansion between the inner and outer pipes.

The primary object of my invention is to overcome the difficulty just pointed out and this without necessitating use of stuffing boxes and the like. It is also my aim to secure utmost simplicity in the construction of jacketed conduits so that they may be installed with greater ease than heretofore possible and prove less liable to derangement in long continued usage.

Other objects and attendant advantages of my invention will become apparent from the detailed description which follows:

Referring to the drawings, Fig. I is an elevation of a portion of a sectional jacketed conduit system conveniently embodying my invention in one form.

Fig. II is an illustration showing, partly in elevation and partly broken away, one of the sections or units of the conduit system and also portions of adjacent units to set forth certain important details to better advantage.

Fig. III is an end elevation of the conduit as viewed from the right of Fig. II.

Fig. IV is an axial section of a modified form of my invention.

Fig. V is an axial sectional view of a coupling more especially adapted to be used between the sectional units of the conduit system; and Figs. VI and VII are, respectively, an axial sectional view, and a cross section of another modified form of my invention.

Referring first to the embodiment of my invention shown in Figs. I, II and III, the conduit system is there represented as comprehending a number of sectional units. Some of these units are straight as indicated at 1, 1, and others curved as shown at 2, 2, the latter serving, collectively, to form an upturned bend 3 for allowing general linear expansion of the system. It is of course to be understood that, when required, several such bends may be interposed in the system, the number depending entirely upon the length of the conduit. As suggested to best advantage in Fig. II, the conduit units (both straight and curved), comprise an inner pipe 5 for conducting the viscous matter, and which is disposed concentrically within a larger or jacketing pipe 6 with interposition of an annular interspace 7 between the two for circulation of a fluid heating medium. The ends of the pipes 5 and 6 are preferably secured, by means of screw threading, in coupling elements 8, 8 which are fastened rigidly together by clamping bolts 9, 9. The inner pipes 5 are let into suitable apertures in internal flanges 10, 10 of the elements 8,·8, and have their contiguous ends substantially abutting in the plane of meeting of said elements. The outer or jacketing pipes 6 have their ends let into integral axial extensions or flanges 11, 11 of the coupling elements 8, and it is to be particularly noted that they terminate short of the ends of the pipes 5, so as to afford annular clearance spaces 12, 12. The clearance space 12 in one element 8 is connected to the corresponding adjacent space in the fellow coupling element through a by-pass pipe 13 which unites radial ducts 14, 14 of said elements leading directly from said clearance spaces. In this way continuous communication is established between the interspaces 7, 7 of the respective sectional units of the conduit. The ducts 14, 14, it will be noted, are disposed at an angle to each other, preferably at a quadrant as suggested in Fig. III so that the fittings necessary to the installation of the pipes 13 may be assembled without incurring undue difficulty. At a region intermediate its ends, preferably at the center, each of the outer or jacketing pipes 6 of the several conduit sections, is corrugated as at 15, 15. Said corrugations are capable of yielding in compensating for local differential linear expansion between the two pipes, and thus serve to obviate possibility of rupture or derangement of the couplings.

Referring now to Fig. IV, the modification there shown is useful in a capacity similar to that of the first embodiment although it is quite different in construction. In this instance, the outer pipes 6 of adjacent conduit units have secured to them, at their ends, flange members 20, 21. Interposed between said flange members is an insert element 22 which will be again referred to presently, and an expansion coupling comprising annular flange heads 23, 24, and a connecting sleeve 25. The parts 20, 22 and 23 are secured rigidly together by bolts 26, and the parts 21 and 24, by bolts 27. The outwardly turned annular terminal ends of the connecting sleeve 25 of the coupling are clamped between the opposing faces of the elements 22, 23 and 21, 24 respectively. Said sleeve has also a peripheral protuberance or corrugation 28 which yields in compensating for differential local expansion between the pipes 5 and 6 in precisely the same manner as described in connection with the first embodiment of my invention. The protuberance or corrugation 28 is protected by appropriate shrouding flanges 29, 29 of the heads 23 and 24. The inner pipes 5, 5, abut in the meeting plane of elements 20, 22 and are screwed into axial apertures of internal flanges of said elements, as clearly shown in the illustration. Continuous communication between the interspaces 7, 7, intermediate the pipes 5 and 6 is established as before through by-pass pipes (not shown) adapted to connect the radial ducts 30, 30 in the parts 20 and 22.

The structure shown in Fig. V is intended for use as a substitute for, or as an auxiliary to, the bend 3 of Fig. I in absorbing general linear expansion of the conduit,—one or more of these devices being employed at different points along the conduit as may be found necessary or desirable in practice. In this organization, the inner and outer pipes 5 and 6 of the respective sections 1, 1 have secured to their ends, flange elements 40, 40 which are identical to the elements 8, 8 of the first embodiment. Said flange elements are united by a coupling comprehensively indicated at 41 comprising flange heads 43, 43 joined by a sleeve 44 and respectively bolted to auxiliary face flange rings 45, 45, which, in turn, are bolted to the elements 40, 40. The sleeve 44 has corrugations 46 and is secured between the elements 43, 45 in a manner similar to that described in connection with the sleeve 25 of the modification of Fig. IV. An annulus 47 serves in conjunction with the axial shroud flanges of the elements 43, 43 in protecting the corrugations of the expansion sleeve. The radial ducts 48, 48 in the elements 40, 40 are to be connected by a by-pass pipe which is sufficiently flexible to permit ready expansion of the coupling.

Referring finally to the modified form of expansion coupling shown in Figs. VI and VII, the elements 50, 50 have annular protuberances 51, 51 which serve after the manner of corrugations to allow for differential linear expansion between the two constituent pipes of the conduit sections. As a further variation, the interspaces 7, 7 of the adjacent conduit sections are here shown as being directly connected by a flexible coupling pipe 52. The functioning of this modification is thought to be obvious in view of what has already been explained in connection with the other forms.

From the foregoing, it will be seen that although I have shown and described my invention in different forms, that they all serve in the attainment of one and the same end, i. e., of compensating for both general and differential expansion between the inner and outer pipes of a double conduit system. The absence of stuffing boxes or similar appurtenances which have been resorted to in systems heretofore designed to serve in the same capacity as my invention, precludes the possibility of leaking joints, as a result of which the cost of maintenance and repair is greatly reduced.

Having thus described my invention, I claim:

1. A jacketed conduit system comprehending a number of sectional units consisting of two pipes, one disposed within the other; coupling devices for connecting the pipes continuously together, said devices having interposed in them corrugations capable of yielding to compensate for differential linear expansion between the pipes.

2. A jacketed conduit system constituted of a number of sectional units consisting of two pipes, one disposed within the other; coupling devices for connecting contiguous ends of the inner pipes directly together, and the jacketing pipes also but with interposition of corrugations capable of yielding to compensate for differential linear expansion between the two pipe sections.

3. A jacketed conduit system comprehending a number of sectional units each comprising two pipes, one disposed within the other; and couplings for connecting the conduit units together in the form of abutting elements having apertured flanges into which contiguous ends of the inner pipes are secured in direct continuity, and also corrugated axial extensions whereto the ends of the jacketing pipes are secured.

4. The combination, of conduit units including inner and outer pipes in substantial concentric relation, and coupling members between the sections connecting related pipes to form a continuous jacketed conduit system, the coupling members including short sections of tubing corrugated to permit contraction and expansion of the system.

5. The combination, of conduit units including inner and outer pipes in substantial concentric relation, coupling members for connecting the pipes to form a continuous jacketed conduit system, each coupling member including a corrugated tubular section, and pairs of coupling flanges for connecting the ends of the tubular section to the adjacent ends of a pair of units between which the coupling member is interposed.

6. A coupling device for jacketed conduit systems, including a tubular corrugated section, coupling members embracing said tubular section and adapted for coupling engagement to the ends of jacketed pipes, and shrouding flanges forming part of the coupling members embracing the corrugated portions.

7. A coupling device for jacketed conduit systems, including a tubular section having multiple corrugations, coupling members embracing the tubular section and adapted for coupling engagement to the adjacent ends of jacketed pipes, annular shrouding flanges forming part of the embracing elements to enclose the corrugations of the tubular section, and an annular protective member interposed between said shields and enclosing intervening corrugations of said tubular member.

8. The combination of conduit units, including inner pipes arranged in continuity, and outer pipes of lesser length, coupling members for connecting the inner pipes and including portions for bridging the space between the ends of the outer pipes, said bridging portions including tubular sections corrugated to permit expansion.

In testimony whereof, I have hereunto signed my name at Philadelphia, Pennsylvania, this 8th day of July, 1921.

FRANK A. BROWNE.

Witnesses:
GEORGE S. GEARER,
JAMES H. BELL.

Certificate of Correction.

It is hereby certified that the assignee in Letters Patent No. 1,495,066, granted May 20, 1924, upon the application of Frank A. Browne, of Wayne, Pennsylvania, for an improvement in "Jacketed Conduits," was erroneously described and specified as "The Barber Asphalt Paving Company," whereas said assignee should have been described and specified as *The Barber Asphalt Company*, as shown by the records of assignments in this office; and that the said Letters Patent should be read with this correction therein that the same may conform to the record of the case in the Patent Office.

Signed and sealed this 5th day of August, A. D. 1924.

[SEAL.]

WM. A. KINNAN,
*Acting Commissioner of Patents.*